(12) United States Patent
Kristiansen et al.

(10) Patent No.: US 8,966,321 B2
(45) Date of Patent: Feb. 24, 2015

(54) LOGICAL PORT AND LAYER PROTOCOL TEST CONFIGURATION RESOURCE MANAGER

(75) Inventors: Jesper Kristiansen, Simi Valley, CA (US); Alok Srivastava, Woodland Hills, CA (US); Razvan Stan, Agoura Hills, CA (US)

(73) Assignee: Ixia, Calabasas, CA (US)

( * ) Notice: Subject to any disclaimer, the term of this patent is extended or adjusted under 35 U.S.C. 154(b) by 318 days.

(21) Appl. No.: 13/467,569

(22) Filed: May 9, 2012

(65) Prior Publication Data

US 2013/0305090 A1 Nov. 14, 2013

(51) Int. Cl.
*G06F 11/00* (2006.01)
*G06F 15/173* (2006.01)
*G06F 11/07* (2006.01)
*H04L 29/08* (2006.01)

(52) U.S. Cl.
CPC ...... *G06F 11/0745* (2013.01); *H04L 29/08081* (2013.01)
USPC ............................... 714/43; 714/25; 709/224

(58) Field of Classification Search
CPC ............ G06F 11/0745; H04L 12/2686; H04L 29/08081; H04L 29/08036; H04L 29/08027; H04J 3/14
USPC ........................................ 714/25, 43; 709/224
See application file for complete search history.

(56) References Cited

U.S. PATENT DOCUMENTS

| | | | |
|---|---|---|---|
| 5,671,351 A | 9/1997 | Wild | |
| 5,757,680 A * | 5/1998 | Boston et al. | 702/121 |
| 5,854,889 A | 12/1998 | Liese | |
| 5,867,483 A | 2/1999 | Ennis | |
| 5,897,609 A * | 4/1999 | Choi et al. | 702/122 |
| 6,279,124 B1 | 8/2001 | Brouwer | |
| 6,295,557 B1 | 9/2001 | Foss | |
| 6,360,332 B1 | 3/2002 | Weinberg | |
| 6,397,359 B1 | 5/2002 | Chandra et al. | |
| 6,473,794 B1 | 10/2002 | Guheen et al. | |
| 6,560,648 B1 | 5/2003 | Dunn et al. | |
| 6,640,249 B1 | 10/2003 | Bowman-Amuah | |

(Continued)

OTHER PUBLICATIONS

Motorola Semiconductor Technical Data MC68HC11C0 Technical Summary 8-Bit Microcontroller, 1996, Motorola, Inc., pp. 2 and 5.*

(Continued)

*Primary Examiner* — Scott Baderman
*Assistant Examiner* — Paul Contino
(74) *Attorney, Agent, or Firm* — SoCal IP Law Group LLP; John E. Gunther; Steven C. Sereboff

(57) ABSTRACT

A test configuration resource manager and a method of managing test configuration resources in a network test system. A computer readable storage medium may store instructions that, when executed, cause a computing device to receive a user input identifying a portion of a first test configuration, store the identified portion of the first test configuration as a test configuration resource in a library of test configuration resources, receive a user input identifying a stored test configuration resource, retrieve the identified stored test configuration resource, and incorporate the retrieved test configuration resource into a second test configuration. The library of test configuration resources may include one or more of port resources, protocol resources, and traffic resources.

14 Claims, 10 Drawing Sheets

(56) References Cited

U.S. PATENT DOCUMENTS

| | | |
|---|---|---|
| 6,664,978 B1 | 12/2003 | Kekic et al. |
| 6,717,917 B1 | 4/2004 | Weissberger et al. |
| 6,788,315 B1 | 9/2004 | Kekic et al. |
| 6,826,259 B2 | 11/2004 | Hoffman |
| 6,873,600 B1 | 3/2005 | Duffield et al. |
| 6,912,717 B2 | 6/2005 | Miller et al. |
| 6,957,186 B1 | 10/2005 | Guheen et al. |
| 6,970,560 B1 | 11/2005 | Hench et al. |
| 6,993,578 B1 | 1/2006 | Dmitroca |
| 7,099,438 B2 | 8/2006 | Rancu et al. |
| 7,177,268 B2 | 2/2007 | Shinagawa |
| 7,181,383 B1 | 2/2007 | McGaughy et al. |
| 7,222,255 B1 * | 5/2007 | Claessens et al. ........... 714/4.12 |
| 7,409,328 B1 | 8/2008 | McGaughy et al. |
| 7,447,622 B2 | 11/2008 | Arama et al. |
| 7,451,212 B2 * | 11/2008 | Friedman ..................... 709/224 |
| 7,453,885 B2 | 11/2008 | Rogers |
| 7,480,840 B2 * | 1/2009 | Hathorn et al. ............... 714/724 |
| 7,492,720 B2 | 2/2009 | Pruthi et al. |
| 7,508,769 B1 | 3/2009 | Duffield et al. |
| 7,515,585 B2 | 4/2009 | Rittmeyer et al. |
| 7,516,216 B2 * | 4/2009 | Ginsberg et al. ............. 709/224 |
| 7,526,478 B2 | 4/2009 | Friedman |
| 7,536,455 B2 | 5/2009 | Duffield et al. |
| 7,603,444 B2 * | 10/2009 | Bullis ........................... 709/220 |
| 7,607,169 B1 | 10/2009 | Njemanze et al. |
| 7,657,623 B2 | 2/2010 | Chisholm |
| 7,676,287 B2 | 3/2010 | Eryurek et al. |
| 7,733,790 B2 * | 6/2010 | Storry et al. ................. 370/250 |
| 7,739,605 B2 | 6/2010 | Plotkin et al. |
| 7,765,093 B2 | 7/2010 | Li et al. |
| 7,885,803 B2 | 2/2011 | Nuzman et al. |
| 7,895,227 B1 | 2/2011 | Henderson |
| 7,895,300 B1 * | 2/2011 | Tansey et al. ................ 709/220 |
| 7,913,002 B2 * | 3/2011 | Washizu et al. .................. 710/62 |
| 7,944,844 B2 | 5/2011 | Ee et al. |
| 7,961,605 B2 | 6/2011 | Gusat et al. |
| 7,992,040 B2 | 8/2011 | Agarwal et al. |
| 8,028,055 B2 | 9/2011 | Duffield et al. |
| 8,031,627 B2 | 10/2011 | Ee et al. |
| 8,041,810 B2 | 10/2011 | Yang et al. |
| 8,051,163 B2 | 11/2011 | Ruiz et al. |
| 8,125,897 B2 | 2/2012 | Ray et al. |
| 8,144,150 B2 | 3/2012 | Gilbert et al. |
| 2002/0198985 A1 | 12/2002 | Fraenkel et al. |
| 2004/0236866 A1 | 11/2004 | Dugatkin et al. |
| 2005/0226249 A1 | 10/2005 | Moore |
| 2005/0289251 A1 * | 12/2005 | Lee et al. .......................... 710/14 |
| 2006/0190594 A1 | 8/2006 | Jorgenson et al. |
| 2006/0262729 A1 | 11/2006 | Chau et al. |
| 2007/0083788 A1 * | 4/2007 | Johnson et al. ................... 714/1 |
| 2007/0179641 A1 | 8/2007 | Lucas et al. |
| 2008/0219164 A1 | 9/2008 | Shimonishi |
| 2008/0259806 A1 | 10/2008 | Jorgenson |
| 2009/0073985 A1 | 3/2009 | Rogers |
| 2009/0187654 A1 | 7/2009 | Raja et al. |
| 2009/0196176 A1 | 8/2009 | Nishimura |
| 2010/0057393 A1 * | 3/2010 | Einsweiler et al. ............ 702/108 |
| 2010/0064039 A9 | 3/2010 | Ginter et al. |
| 2012/0051234 A1 * | 3/2012 | Gintis et al. .................. 370/250 |
| 2012/0236728 A1 * | 9/2012 | Dalmau et al. ................ 370/241 |

OTHER PUBLICATIONS

Simoneau, Paul, The OSI Model: Understanding the Seven Layers of Computer Networks, 2006, Global Knowledge Training LLC, pp. 2-6.*

Ixia Communications, Inc., IxExplorer User's Guide, Nov. 1, 1999, Ixia Communications, Inc., Revision 2.1.0, pp. 5-14 to 5-31.*

* cited by examiner

LOGICAL PORT AND LAYER PROTOCOL TEST CONFIGURATION RESOURCE MANAGER

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to defining test configurations and test methods for testing a network or network device.

2. Description of the Related Art

In many types of communications networks, each message to be sent is divided into portions of fixed or variable length. Each portion may be referred to as a packet, a frame, a cell, a datagram, a data unit, or other unit of information, all of which are referred to herein as packets.

Each packet contains a portion of an original message, commonly called the payload of the packet. The payload of a packet may contain data, or may contain voice or video information. The payload of a packet may also contain network management and control information. In addition, each packet contains identification and routing information, commonly called a packet header. The packets are sent individually over the network through multiple switches or nodes. The packets are reassembled into the message at a final destination using the information contained in the packet headers, before the message is delivered to a target device or end user. At the receiving end, the reassembled message is passed to the end user in a format compatible with the user's equipment.

Communications networks that transmit messages as packets are called packet switched networks. Packet switched networks commonly contain a mesh of transmission paths which intersect at hubs or nodes. At least some of the nodes may include a switching device or router that receives packets arriving at the node and retransmits the packets along appropriate outgoing paths. Packet switched networks are governed by a layered structure of industry-standard protocols. Layers 1, 2, 3, 4, and 7 of the structure are the physical layer, the data link layer, the network layer, the transport layer, and the application layer, respectively.

Layer 1, or physical layer, protocols define the physical (electrical, optical, or wireless) media between nodes of the network and the rules and processes used to access that media. Layer 1 protocols include various Ethernet physical configurations, the Synchronous Optical Network (SONET) and other optical connection protocols, and various wireless protocols such as Wi-Fi.

Layer 2 protocols govern how data is logically transferred between nodes of the network. Layer 2 protocols include the Ethernet, Asynchronous Transfer Mode, Frame Relay, Point to Point Protocol, Layer 2 Tunneling Protocol, Fiber Distributed Data Interface, Synchronous Data Link Control, High-Level Data Link Control, Integrated Services Digital Network, Token Ring, various wireless protocols, various Ethernet and Fibre Channel protocols, and other protocols.

Layer 3 protocols govern how packets are routed from a source to a destination along paths connecting multiple nodes of the network. The dominant layer 3 protocols are the well-known Internet Protocol version 4 (IPv4) and version 6 (IPv6). A packet switched network may need to route IP packets using a mixture of layer 2 protocols. At least some of the nodes of the network may include a router that extracts a destination address from a network layer header contained within each packet. The router then uses the destination address to determine the route or path along which the packet should be retransmitted. A typical packet may pass through a plurality of routers, each of which repeats the actions of extracting the destination address and determining the route or path along which the packet should be retransmitted.

Layer 4 protocols govern end-to-end message delivery in a network. In particular, the Transmission Control Protocol (TCP) provides for reliable delivery of packets streams using a system of sequential acknowledgement and retransmission when necessary. TCP is a connection-oriented protocol in which two devices exchange messages to open a virtual connection via the network. Once a connection is opened, bidirectional communications may occur between the connected devices. The connection may exist until closed unilaterally by one of the devices. Opening and closing a connection both require several steps at which specific messages are exchanged between the two devices. A connection may also be closed when an anticipated response is not received by one device for a predetermined period of time, commonly called a "time-out". A TCP connection is considered to be "stateful" since each device must maintain information describing the state of the connection (being opened, established, being closed), what data has been sent, and what sent data has been acknowledged. The User Datagram Protocol (UDP) is an alternative layer 4 protocol that provides for delivery of packet streams. UDP connections are stateless and do not provide for reliable delivery.

Layer 7, or application layer, protocols include the HyperText Transfer Protocol (HTTP) used to convey HTML documents such as Web pages, and the Simple Mail Transfer Protocol (SMTP) and Post Office Protocol (POP3) used to convey electronic mail messages. Other layer 7 protocols include Simple Message System (SMS), File Transfer Protocol (FTP), Real Time Protocol (RTP), Real-time Transport Control Protocol (RTCP), Real Time Streaming Protocol (RTSP), Media Gateway Control Protocol (MEGACO), Session Initiation Protocol (SIP), and other protocols used to transfer data, voice, video, and network control information over a network.

In this patent, the term "network under test" (NUT) encompasses all or a portion of a packet switched communications network or one or more network devices within, or for use in, a packet switched communications network. In order to test a NUT, test traffic comprising a large number of packets may be generated and transmitted to and/or through the NUT at one or more ports. Return test traffic transmitted through and/or from the NUT may be received at different ports. The received test traffic may be analyzed to measure the performance of the NUT. In this context, the term "port" refers to a logical entity coupled to the NUT by a communications path. The term "port unit" refers to a module within the network test equipment that connects to the NUT at a port. Thus a "port" encompasses a physical "port unit" and the data and parameters that define and constraint the operation of the port unit during attest session. Each port connected to the NUT may be both a source of test traffic and a destination for test traffic. Each port may emulate a plurality of logical source or destination addresses. Each port may emulate a plurality of network users, clients, peers, servers, or other network devices.

The test traffic may depend on the type of network or device to be tested and the type of test to be performed. For example, when a NUT is a switch or router operating at layer 2 or layer 3 of the network structure, the test traffic may include a large plurality of IP packets apparently originating from a plurality of source IP addresses and destined for a plurality of destination IP addresses. In this case, the actual content of the IP packets may be unimportant.

When the NUT operates at a higher layer of the network structure (for example, when the NUT is or includes a server, a server load balancer, a firewall, a network security device that performs packet inspection, or similar network devices), the test traffic may include or be a large plurality of TCP connections of a larger number of application layer transactions (e.g. HTTP GET transactions).

The first step in testing a NUT is to generate a test configuration. In this patent, a "test configuration" is a data set that defines both a test system and a test procedure to be used to test the NUT. A test configuration may include, for example, data defining the number and types of port units that will be connected to the NUT, the attributes and capabilities of each port, the protocols to be executed by each port, the traffic to be generated by each port, and the test data to be acquired during the test.

Throughout this description, elements appearing in figures are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

DETAILED DESCRIPTION

Description of Apparatus

Figure 1:
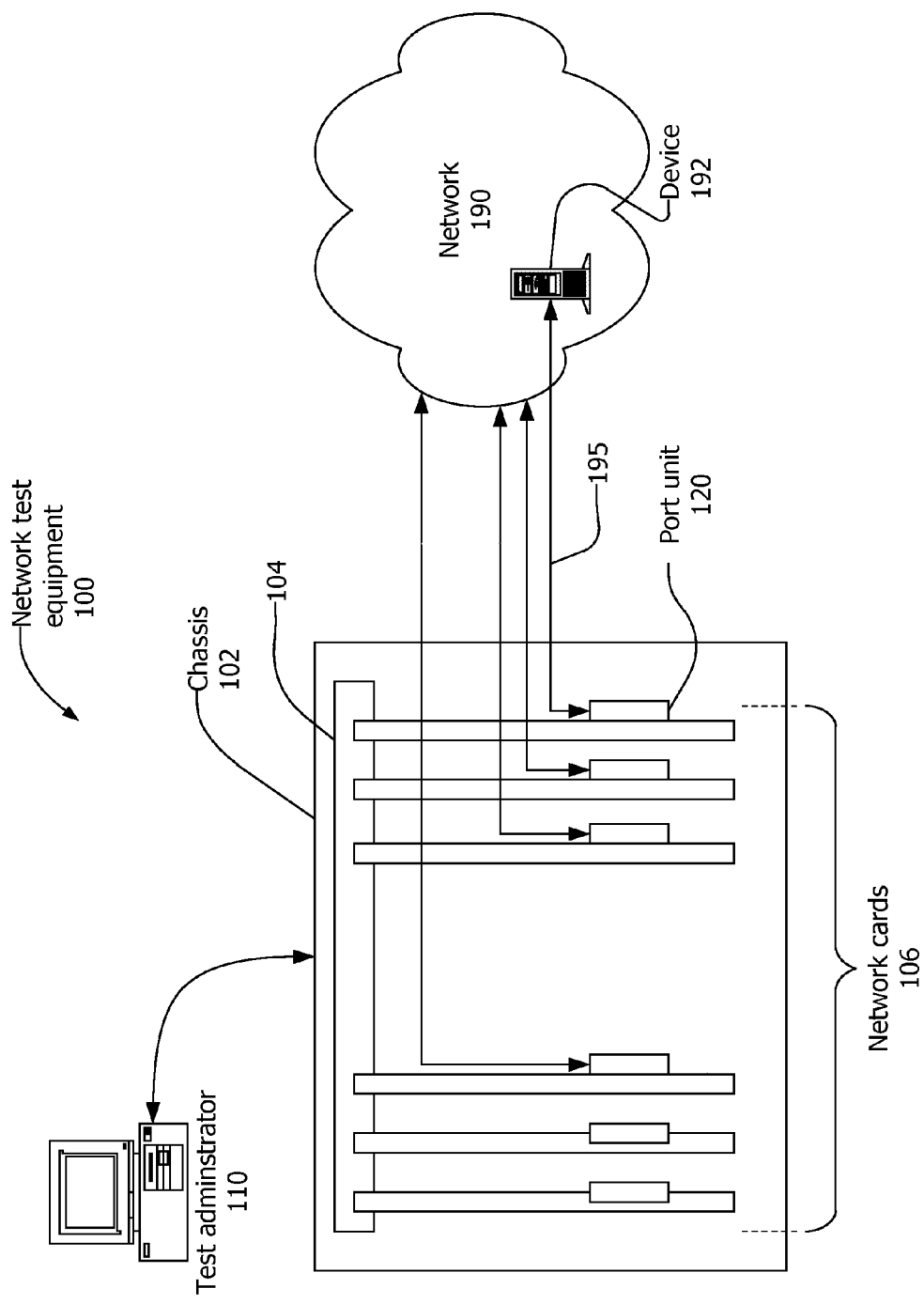
FIG. 1 is a block diagram of a network environment.

FIG. 1 shows a block diagram of a network environment. The environment may include network test equipment 100 and a network 190 which includes one or more network devices 192.

The network test equipment 100 may be a network testing device, performance analyzer, conformance validation system, network analyzer, or network management system. The network test equipment 100 may include one or more network cards 106 and a backplane 104 contained or enclosed within a chassis 102. The chassis 102 may be a fixed or portable chassis, cabinet, or enclosure suitable to contain the network test equipment. The network test equipment 100 may be an integrated unit, as shown in FIG. 1. Alternatively, the network test equipment 100 may comprise a number of separate units cooperative to provide traffic generation and/or analysis. The network test equipment 100 and the network cards 106 may support one or more well known standards or protocols such as the various Ethernet and Fibre Channel standards, and may support proprietary protocols as well.

The network cards 106 may include one or more field programmable gate arrays (FPGAs), application specific integrated circuits (ASICs), programmable logic devices (PLDs), programmable logic arrays (PLAs), processors, and other kinds of devices. In addition, the network cards 106 may include software and/or firmware. The term network card encompasses line cards, test cards, analysis cards, network line cards, load modules, interface cards, network interface cards, data interface cards, packet engine cards, service cards, smart cards, switch cards, relay access cards, and the like. The term network card also encompasses modules, units, and assemblies that may include multiple printed circuit boards. Each network card 106 may support a single communications protocol, may support a number of related protocols, or may support a number of unrelated protocols. One or more network cards 106 or their equivalent may be permanently installed in a self-contained test unit or tests appliance.

Each network card 106 may contain one or more port unit 120. Each port unit 120 may include circuits and software to generate test traffic and/or to receive and analyze test traffic. Each port unit may be coupled to the test administrator 105. Each port unit 120 may connect to the network 190 through one or more ports. Each port unit 120 may be connected to the network 190 through a communication medium 195, which may be a wire, an optical fiber, a wireless link, or other communication medium.

The backplane 104 may serve as a bus or communications medium for the network cards 106. The backplane 104 may also provide power to the network cards 106.

The network test equipment 100 may also include a test administrator 110. The test administrator 110 may be a computing device included within or coupled to the chassis 102. The test administrator 110 may include an operator interface (not shown) that may be used to plan a test session, to control the test session, and/or to view test results during and after the test session. The operator interface may include, for example, a display and a keyboard, mouse, and/or other input devices (not shown). The test administrator 110 may include or be coupled to a printer or other data output device (not shown) for output of test results. The test administrator 110 may include or be coupled to a storage device (not shown) for storing test data and results for future review and/or analysis.

The network 190 may be a Local Area Network (LAN), a Wide Area Network (WAN), a Storage Area Network (SAN), wired, wireless, or a combination of these, and may include or be the Internet. Communications on the network 190 may take various forms, including frames, cells, datagrams, packets or other units of information, all of which are referred to herein as packets. The network test equipment 100 and the network devices 192 may communicate simultaneously with one another, and there may be plural logical communications paths between the network test equipment 100 and a given network device 192. The network itself may be comprised of numerous nodes providing numerous physical and logical paths for data to travel.

The one or more network devices 192 may be any devices capable of communicating over the network 190. The one or more network devices 192 may be computing devices such as workstations, personal computers, servers, portable computers, personal digital assistants (PDAs), computing tablets, cellular/mobile telephones, e-mail appliances, and the like;

peripheral devices such as printers, scanners, facsimile machines and the like; network capable storage devices including disk drives such as network attached storage (NAS) and storage area network (SAN) devices; networking devices such as routers, relays, hubs, switches, bridges, server load balancers (SLBs), and multiplexers. In addition, the one or more network devices 192 may include appliances, alarm systems, and any other device or system capable of communicating over a network. The network 190 may consist of a single network device 192 or a plurality of network devices interconnected by a plurality of communications paths, all of which will be referred to herein as the network under test (NUT).

Figure 2:
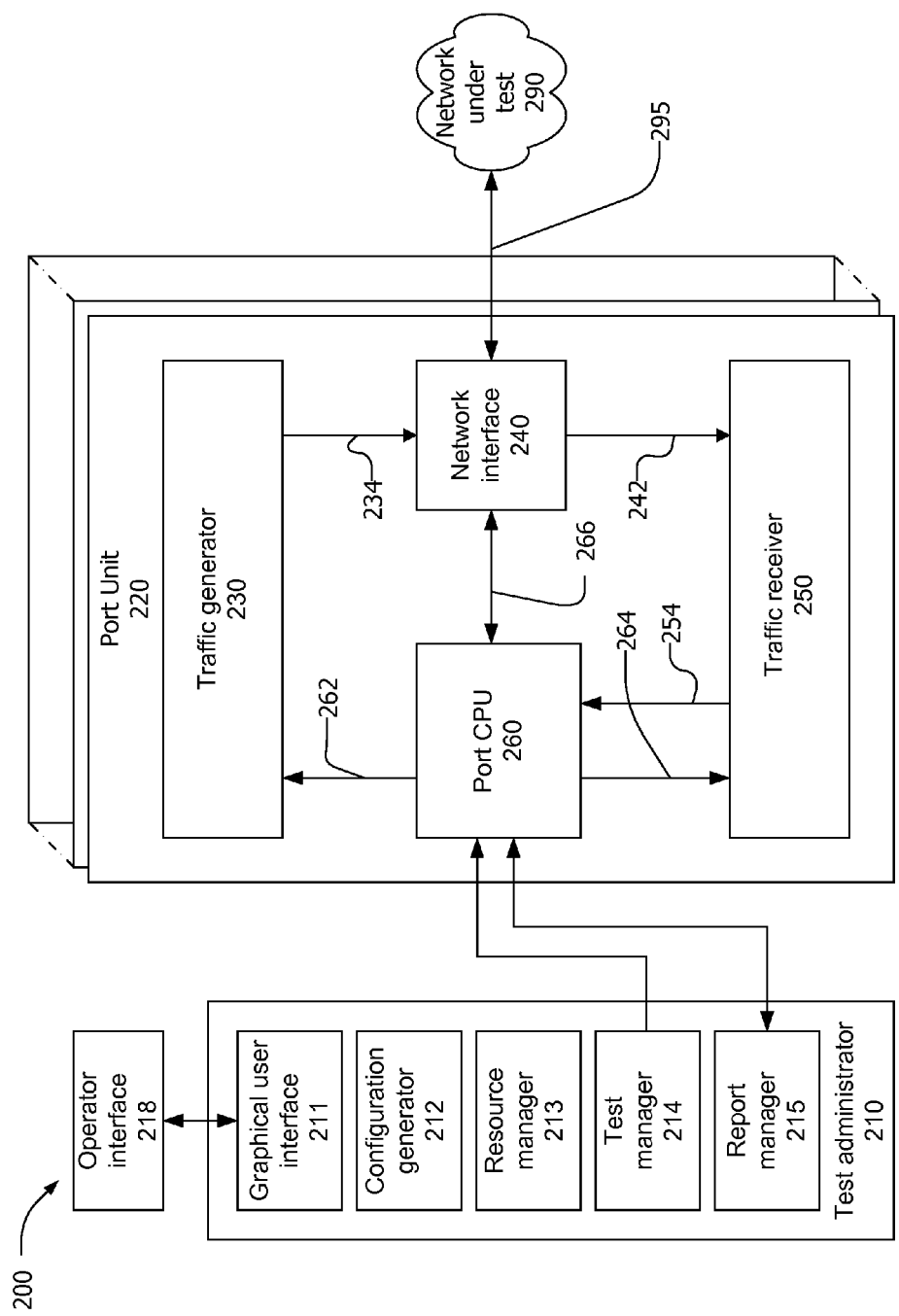
FIG. 2 is a block diagram of a test system.

Referring now to FIG. 2, a test system 200, which may be the network test equipment 100 may includes a test administrator 210 coupled to a plurality of port units including an exemplary port unit 220. The port unit 220 may include a port central processor unit 260 (CPU), a traffic generator unit 230, a traffic receiver unit 250, and a network interface unit 240 which couples the port unit 220 to a network under test 290. The port unit 220 may be all or part of a network card such as the network cards 106.

The port CPU 260 may include a processor, a memory coupled to the processor, and various specialized units, circuits, software and interfaces for providing the functionality and features described here. The processes, functionality and features may be embodied in whole or in part in software which operates on the processor and may be in the form of firmware, an application program, an applet (e.g., a Java applet), a browser plug-in, a COM object, a dynamic linked library (DLL), a script, one or more subroutines, or an operating system component or service. The hardware and software and their functions may be distributed such that some functions are performed by the processor and others by other devices.

The port CPU 260 may provide the traffic generator unit 230 with stream forming data 262 to form a plurality of streams. The stream forming data 262 may include, for example, the type of packet, the frequency of transmission, definitions of fixed and variable-content fields within the packet and other information for each packet stream. The traffic generator unit 230 may then generate the plurality of streams in accordance with the stream forming data 262. The plurality of streams may be interleaved to form outgoing traffic 234. Each of the streams may include a sequence of packets. The packets within each stream may be of the same general type but may vary in length and content.

The network interface unit 240 may convert the outgoing traffic 234 from the traffic generator unit 230 into the electrical, optical, or wireless signal format required to transmit the test traffic to the network under test 290 via a link 295. The link 295 may be a wire, an optical fiber, a wireless link, or other communication link. Similarly, the network interface unit 240 may receive electrical, optical, or wireless signals from the network over the link 295 and may convert the received signals into incoming traffic 242 in a format usable to the traffic receiver unit 250.

The traffic receiver unit 250 may receive the incoming traffic 242 from the network interface unit 240. The traffic receiver unit 250 may determine if each received packet is a member of a specific flow, and may accumulate test statistics for each flow in accordance with test instructions 264 provided by the port CPU 260. The accumulated test statistics may include, for example, a total number of received packets, a number of packets received out-of-sequence, a number of received packets with errors, a maximum, average, and minimum propagation delay, and other statistics for each flow. The traffic receiver unit 250 may also capture and store specific packets in accordance with capture criteria included in the test instructions 264. The traffic receiver unit 250 may provide test statistics and/or captured packets 254 to the port CPU 260, in accordance with the test instructions 264, for additional analysis during, or subsequent to, the test session.

Some amount of interactive communications may be required between the port unit 220 and the network under test 290 during a test session. The interactive communications may include, for example, TCP connections and application-layer transactions. Such traffic may be initiated, managed, and processed by the port CPU 260 and thus may be referred to as "CPU traffic". As shown in FIG. 2, the port CPU 260 may be coupled to the network interface unit 240 such that CPU traffic 266 may be communicated between the port CPU 260 and the network under test 290 via the network interface unit 240. Although not shown in FIG. 2, outgoing CPU traffic may be routed from the Port CPU 260 to the network interface unit 240 via the traffic generator unit 230, and incoming CPU traffic may be routed from the network interface unit to the port CPU via the traffic receiver unit 250.

The port CPU 260 may communicate with a test administrator 210, which in turn may communicate with or include an operator interface 218. The test administrator 210 may be a computing device connected to the port unit 220 via a bus, a network, or another communications path. The operator interface 218 may include at least one display device and one or more input devices such as a keyboard, a mouse or other pointing device, and/or a touch screen.

The hardware and software of the test administrator 210 may perform multiple functions including a graphical user interface 211, a configuration generator 212, a resource manager 213, a test manager 214, and a report manager 215. The configuration generator 212 may develop a test configuration based, at least in part, on instructions and data received from a test engineer or other operator via the graphical user interface 211 and the operator interface 218. The resource manager may manage a catalog of test configuration resources stored in a configuration library (not shown). Each stored test configuration resource may be a reusable fragment of a test configuration. The test manager 214 may provide the port CPU 260 of each port unit 220 with instructions, parameters, and data required for each port unit to participate in testing the network under test 290 in accordance with the test configuration generated by the configuration generator 212. The instructions and data provided by the test manager 216 to each port unit 220 may include, for example, data enabling or disabling various capabilities and protocols, operational parameters, definitions of packet streams to be generated by the port unit and definitions of performance statistics to be accumulated by the port unit. The report manager 215 may request interim and final test statistics and other test data from each port unit 220, format the test data into reports, and present the reports to the operator via the graphical user interface 211 and the operator interface 218.

Figure 3:
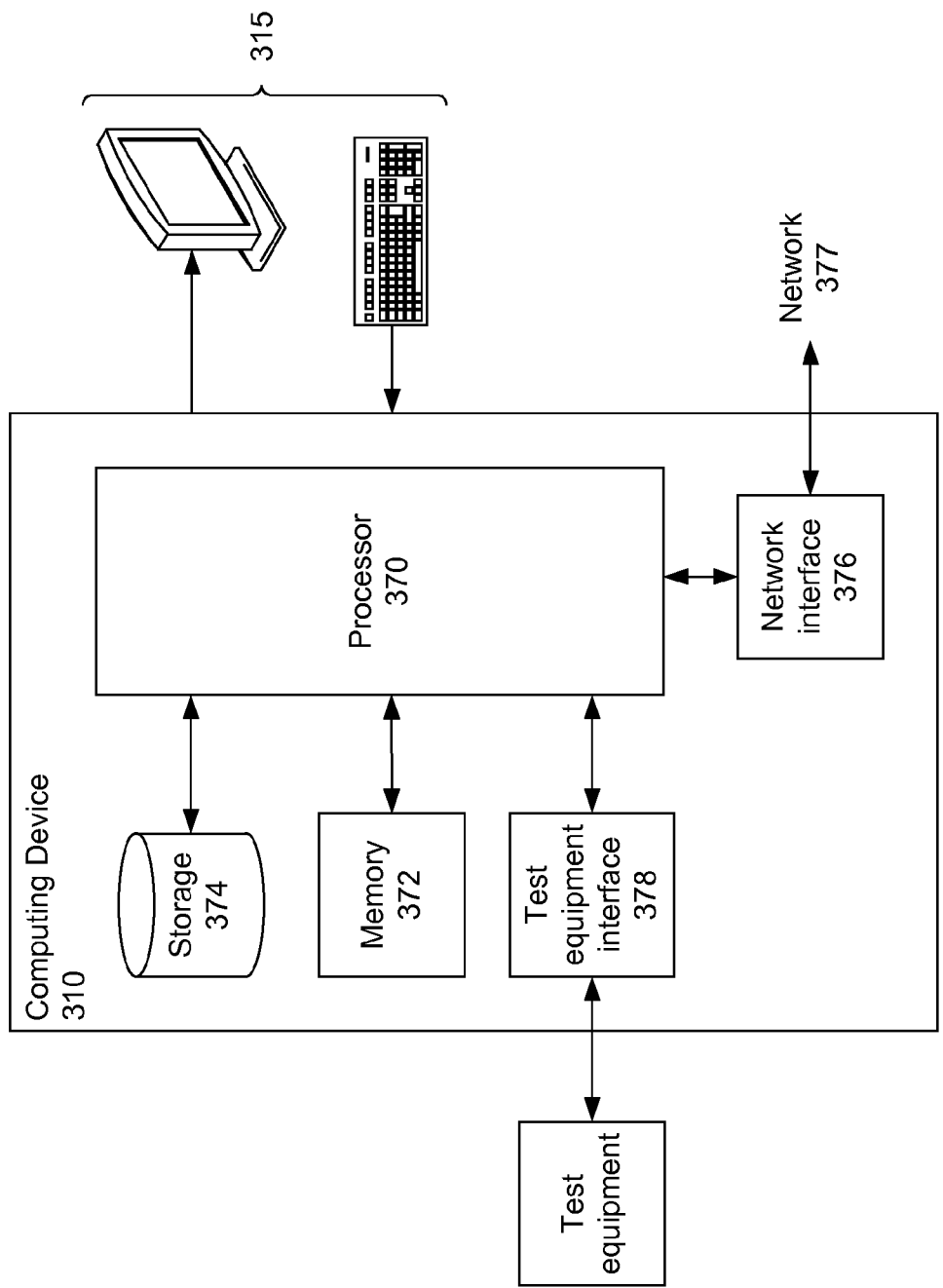
FIG. 3 is a block diagram of a computing device.

Referring now to FIG. 3, a computing device 310, which may be the test administrator 210, may include at least one processor 370 coupled to a memory 372. The processor 370 may be a single processor, multiple processors, or multiple processor cores within one or more processor circuit devices. The memory 372 may be static and/or dynamic random access memory or a combination of random access memory and other memory such as nonvolatile writable memory and read only memory. The memory 372 may temporarily or permanently store software instructions for execution by the processor 370 and data for use during the execution of those instructions.

The processor 370 may be coupled to a network 377, which may be or include the Internet, via a network interface 376. The processor 370 may be coupled to a user interface 315, which may includes a display and a keyboard and other devices that are not shown. The processor 370 may be configured to communicate with test equipment, such as the chassis 102 and network cards 106, via a test equipment interface 378.

The computing device 310 may execute an operating system, including, for example, variations of the Linux, Microsoft® Windows®, Symbian®, and Apple® Mac® operating systems. To access the Internet, the client computer may run a browser such as Microsoft® Explorer® or Mozilla® Firefox®, and an e-mail program such as Microsoft® Outlook® or Lotus Notes®. The computing device 310 may execute one or more application programs to perform the actions and methods described herein.

The operating system and/or application programs may be stored in the form of instructions on a machine readable storage medium within a storage device 374 coupled to the processor 370. Machine readable storage media include, for example, magnetic media such as hard disks, floppy disks and tape; optical media such as compact disks (CD-ROM and CD-RW) and digital versatile disks (DVD and DVD±RW); flash memory cards; and other storage media. Within this patent, the term "storage medium" refers to a physical object capable of storing data. The term "storage medium" does not encompass transitory media, such as propagating signals or waveforms.

Description of Processes

Figure 4:
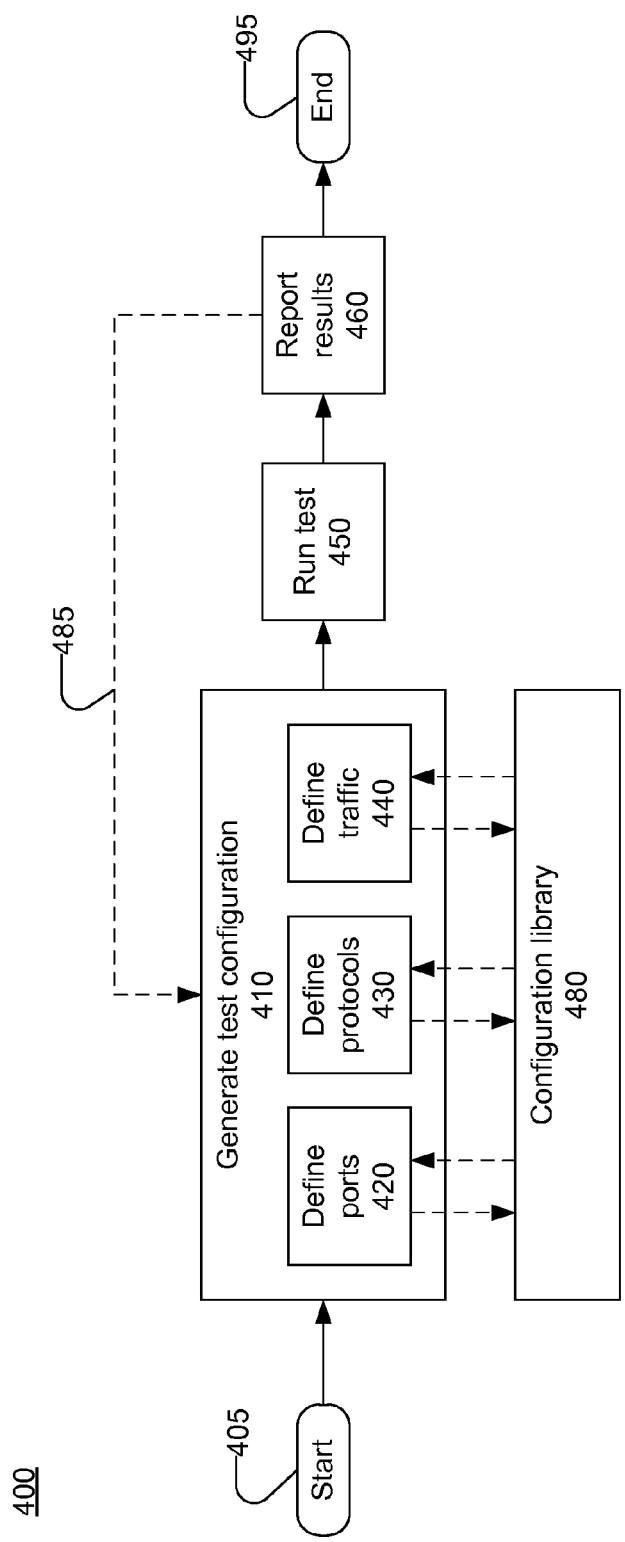
FIG. 4 is a flow chart of a process for testing a NUT.

Referring now to FIG. 4, a process 400 for testing a NUT may start at 405 and finish at 495. The process 400 may be executed within a test environment such as that shown in FIG. 1. The process 400 may be performed using a test administrator 210 in conjunction with a plurality of port units 220. The process 400 may be used to test a network such as the network 190 and/or a network device such as the network device 192.

The process 400 may include generating a test configuration at 410, running a test session according to the test configuration at 450, and reporting test results at 460. For ease of description, these actions are shown to be sequential in FIG. 4. However, these actions may be performed, to at least some extent, concurrently. For example, interim test results may be reported at 460 while a test session is still running at 450. Further, the process 400 may be, to at least some extent, cyclic. For example, interim test results reported at 460 may be used to modify the test configuration, either automatically or as a result of some user action, as indicated by dashed line 485.

Generating a test configuration at 410 may include, at 420, defining a plurality of ports to be used to test the NUT. Each port may be defined by a set of port attributes describing the hardware and physical layer configuration of the port. Port attributes may include, for each port, identification of the hardware used to implement the port, the physical layer protocol implemented by the port, parameters to be used by the port, and other data. For example, the hardware may be identified by a model or part number of a line card and a chassis. The physical layer protocol may be an Ethernet protocol, ATM (asynchronous transfer mode, PoS (packet over Synchronous Optical Networking/Synchronous Digital Hierarchy), Fibre Channel, or some other physical layer protocol. Parameters included in the port attributes may include, for example, a physical layer address for the port, a data rate or interface type, a selection of a cyclic redundancy code (e.g. 16-bit or 32-bit), and parameters defining whether or not optional features (e.g. flow control, data scrambling, auto negotiation of data rates, etc.) are enabled.

A port unit, such as the port unit 220, may include hardware and software for 50 or more different protocols for data communications, security, network control, and routing. Depending on the nature of the tests to be performed during a test session, each port may typically use only a portion of the total number of protocols within its capability. Generating a test configuration at 410 may include, at 430, defining a layer 2/3 protocol suite which is a subset of the available protocols that will be active at each port. Defining the layer 2/3 protocol suite may include identifying layer 2 and layer 3 protocols to be usable at each port and defining all protocol attributes to be used by the ports. The term "protocol attributes" includes all parameters and data necessary for the use of the identified protocols. Many, but not all, protocols require one or more attribute to be defined. A common example of a protocol attribute is an IPv4 or IPv6 address.

Each protocol suite may include at least one layer 2 media access protocol consistent with the physical layer protocol of the corresponding port. For example, a layer 2/3 protocol suite for an Ethernet port may include the Ethernet media access protocol, and the protocol suite for an ATM port may include the ATM media access protocol.

When a port is connected to the network, the port must announce its presence and distribute its address to the other nodes of the network. Thus the layer 2/3 protocol suite for each port will typically include at least one routing protocol such as BGP (border gateway protocol) or OPSF (open shortest path first). The layer 2/3 protocol suite for each port will typically also include at least one layer 3 communications protocol, such as IPv4 (Internet Protocol version 4) for exchanging data units with other nodes of the network.

Generating a test configuration at 410 may also include, at 440, defining the traffic to be generated by the ports while testing the NUT. The test traffic and the data used to define the test traffic may depend on the type of network or device to be tested. For example, when a NUT is a switch or router operating at layer 2 or layer 3 of the network structure, the test traffic may include a large plurality of IP packets apparently originating from a plurality of source IP addresses and destined for a plurality of destination IP addresses. In this case, the actual content of the IP packets may be unimportant. However, when the NUT operates at a higher layer of the network structure (for example, a server, a server load balancer, a network security device that performs packet inspection, and other network devices), the test traffic may include or be a plurality of simulated TCP connections or simulated application-layer transactions. In this case, the test traffic may be defined at 440 in terms of TCP connections, application layer transaction (e.g. HTTP Put and Get transactions), or emulated user activities, each of which causes some traffic to be generated and transmitted via the NUT.

While generating the test configuration at 410, one or more portion of the test configuration may be stored in, or retrieved from, a configuration library 480. A "configuration library" is any memory storing one or more portions of a test configuration in retrievable form. Portions of a test configuration stored in the configuration library 480 will be referred to herein as "configuration resources" or "test configuration resources". Configuration resources stored in the configuration library 480 may include port resources, protocol resources, and traffic resources. Each configuration resource may be stored in the configuration library as a separate object or separate data file. Each configuration resource may be stored as a user-readable object, such as an XML object or in some other format.

Figure 5:
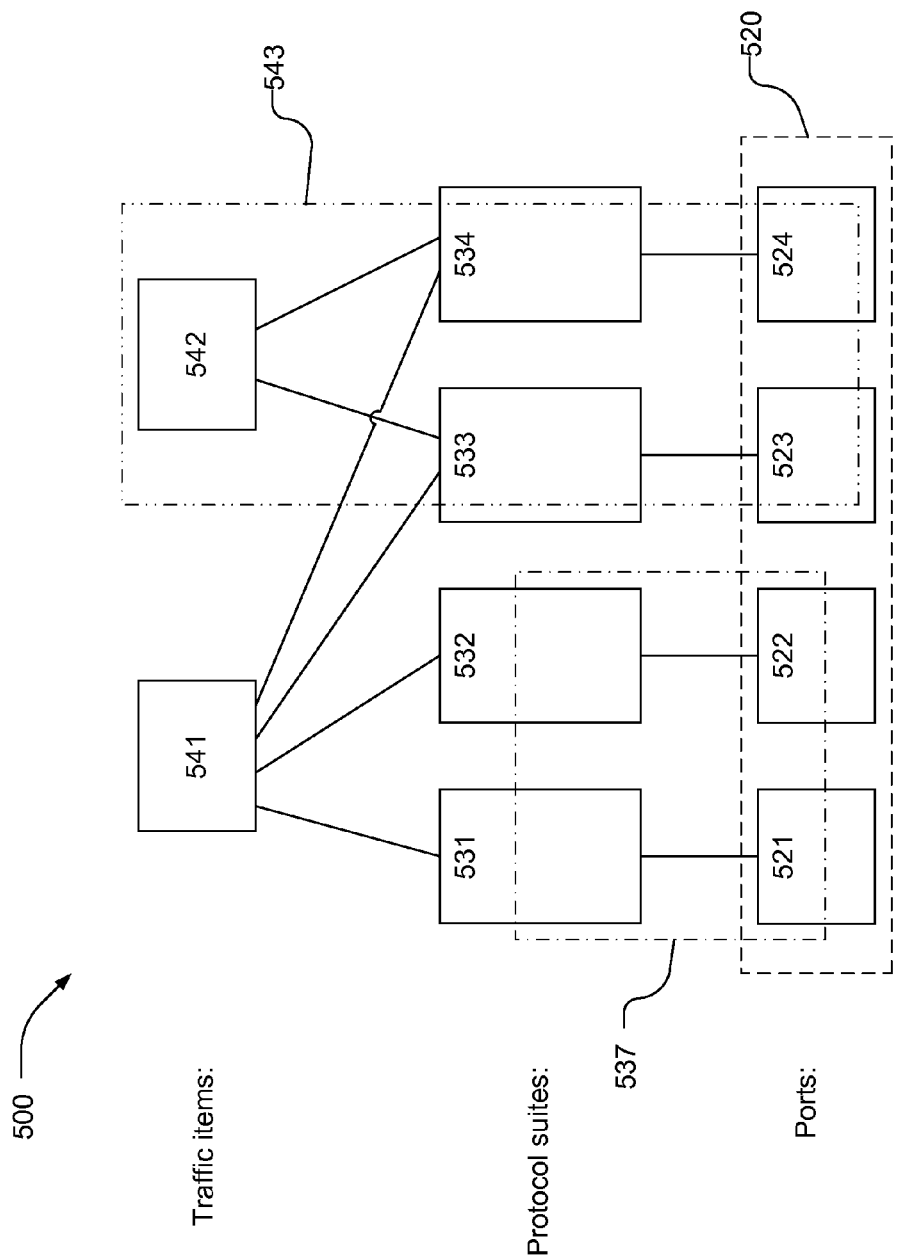
FIG. 5 is a graphical representation of a test configuration.

FIG. 5 shows a graphical representation of an exemplary test configuration 500 including port, protocol, and traffic resources. The exemplary test configuration 500 includes four ports 521, 522, 523, 524. A real-world test configuration may have more or fewer than four ports, and may include a large plurality of ports (one hundred or more), each of which has an associated protocol suite.

Each port 521, 522, 523, 524 is associated with a respective layer 2/3 protocol suite, 531, 532, 533, 534. Each layer 2/3 protocol suite identifies protocols that are active on the respective port and defines protocol attributes for those protocols.

The test configuration 500 includes two traffic items 541, 542. Each traffic item may define traffic to be generated during a test session using the test configuration 500. In this example, traffic item 541 utilizes all four ports 521, 522, 523, 524 and the associated layer 2/3 protocol suites. Traffic item 542 only utilizes ports 523 and 524 and the associated layer 2/3 protocol suites.

In this example, the attributes of ports 521, 522, 523, and 524 are stored in a configuration library, such as the configuration library 480, as a port resource 520. A "port resource" is a data set defining the hardware and physical layer configuration and attributes of one or more ports. The port resource 520 may have been stored in the configuration library during or after the generation of the test configuration 500. The port resource 520 may have been previously stored in the configuration library and retrieved during the generation of the test configuration 500.

Figure 6:
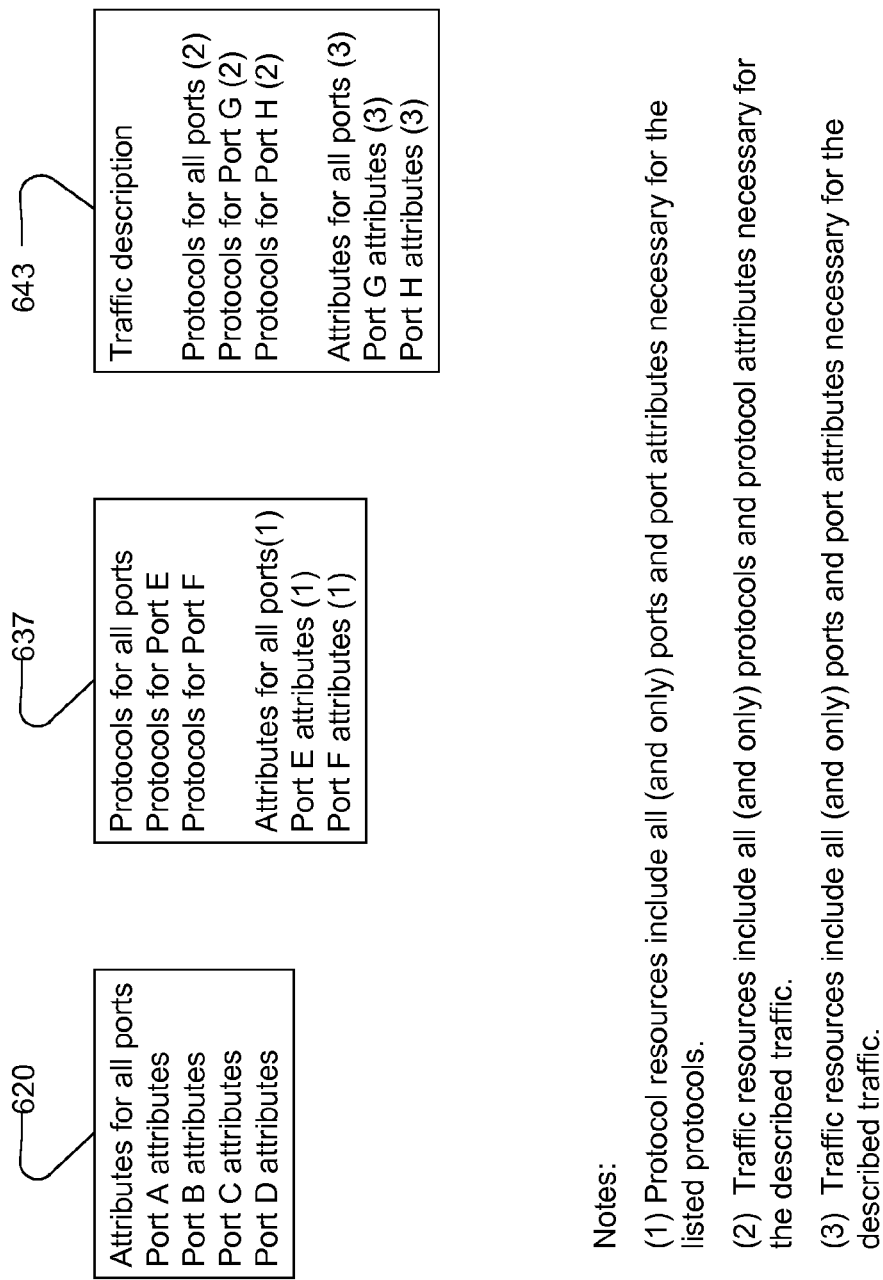
FIG. 6 is a graphical representation of test configuration resources

FIG. 6 is a graphic representation of resources that may be stored in a configuration library such as the configuration library 480. A port resource 620 may include port attributes for four ports, identified as port A, port B, port C, and port D. These ports may correspond to ports 521, 522, 523, and 524 in FIG. 5. The port resource 620 may not define absolute port numbers, since the four ports defined by the port resource 620 may be assigned other port numbers in a different test configuration. The port resource 620 may include a list of port attributes common to all four ports and unique port attributes, if any, for each port.

In the example of FIG. 5, all or a portion of the protocols suites 531 and 532 is stored in the configuration library as a protocol resource 537. However, the ability to successfully execute a protocol may depend on the associated port having necessary characteristics. For example, the ATM Adaptation Layer 5 (AAL5) protocol (commonly used to transmit IP frames over ATM physical networks) is only operable if the associated port is compatible with an ATM physical layer. Similarly, the Ethernet MAC layer 2 protocol is only operable within a port having an Ethernet physical layer. Thus a "protocol resource" is a data set that identifies one or more layer 2/3 protocols and defines both the attributes of the layer 2/3 protocols and the necessary port configuration and port attributes required to operate the protocols. In this example, the protocol resource 537 may include all or portions of the layer 2/3 protocol suites 531 and 532 and all or portions of the attributes of ports 521 and 522.

Referring again to FIG. 6, a protocol resource 637 may identify protocols and define protocol attributes for two ports, identified as port E and port F. These ports may correspond to ports 521 and 522 in FIG. 5. The protocol resource 637 may not define absolute port numbers, since the two ports defined by the protocol resource 637 may be assigned other port numbers in a different test configuration. The protocol resource 637 may identify protocols and define protocol attributes common to both port E and port F, and may identify protocols and define protocol attributes unique to each port. The protocol resource 637 may define the port configuration and port attributes necessary for operation of the identified protocols. The protocol resource 637 may define only those port attributes necessary for operation of the identified protocols. The protocol resource 637 may include a list of the port attributes common to both port E and port F and unique port attributes, if any, for each port.

Referring back to FIG. 5, in this example all or a portion of the traffic item 542 is stored in the configuration library as a traffic resource 543. However, the ability to successfully generate the traffic defined in a traffic resource may depend on the associated ports having necessary characteristics and layer 2/3 protocols. For example, a traffic resource may call for a plurality of TCP connections to be established between four ports. However, to successfully establish TCP connections between four ports, it is necessary that the ports exist and that the necessary layer 2/3 protocols are enabled (i.e. at least IPv4 or IPv6) at each port. Thus a "traffic resource" is data set that describes traffic to be exchanged between two or more ports and defines the layer 2/3 protocols, the associated protocol attributes, and the port configuration and port attributes necessary to generate and receive the described traffic. In this example, the traffic resource 542 may include all or portions of the layer 2/3 protocol suites 533 and 534 and all or portions of the attributes of ports 523 and 524.

Referring once again to FIG. 6, a traffic resource 643 may describe network traffic to be exchanged between two ports, identified as port G and port H. These ports may correspond to ports 523 and 524 in FIG. 5. The traffic resource 643 may not define absolute port numbers, since the two ports required by the traffic resource 643 may be assigned other port numbers in a different test configuration. The traffic resource 643 may describe the traffic in terms of IP datagrams, TCP connections, application layer transactions, user activities, and combinations of these and other traffic types. The traffic resource 643 may define the ports, port attributes, layer 2/3 protocols, and protocol attributes necessary to exchange the described traffic. The traffic resource 643 may identify layer 2/3 protocols and define protocol attributes common to both port G and port H, and may identify layer 2/3 protocols and define protocol attributes unique to each port. The traffic resource 643 may define port attributes common to both port G and port H, and may define port attributes unique to each port. The traffic resource 643 may define only the port configuration, port attributes, layer 2/3 protocols, and protocol attributes necessary to exchange the described traffic.

Figure 7:
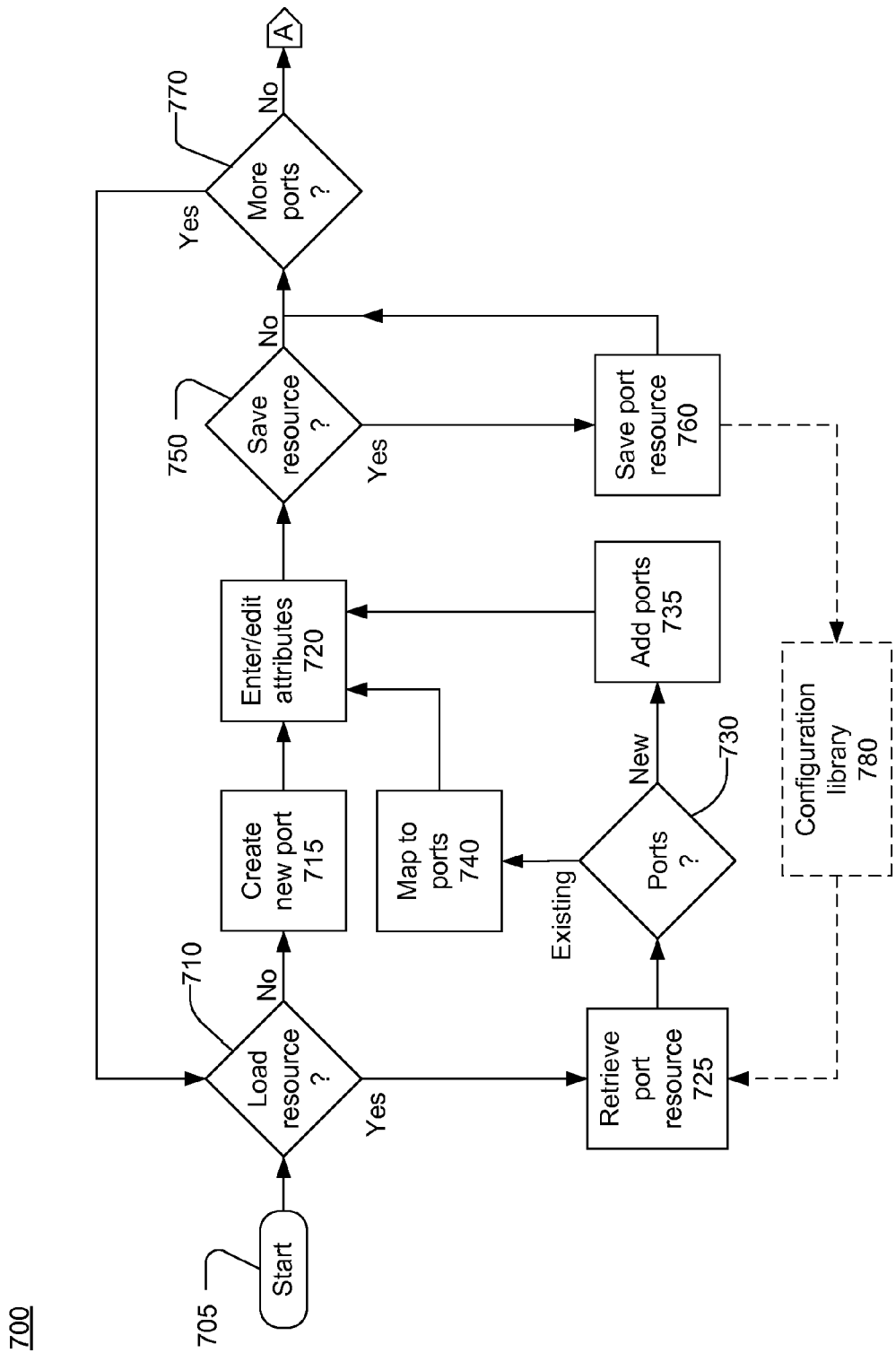
FIG. 7 is a flow chart of a portion of a process for defining a test configuration.
Figure 8:
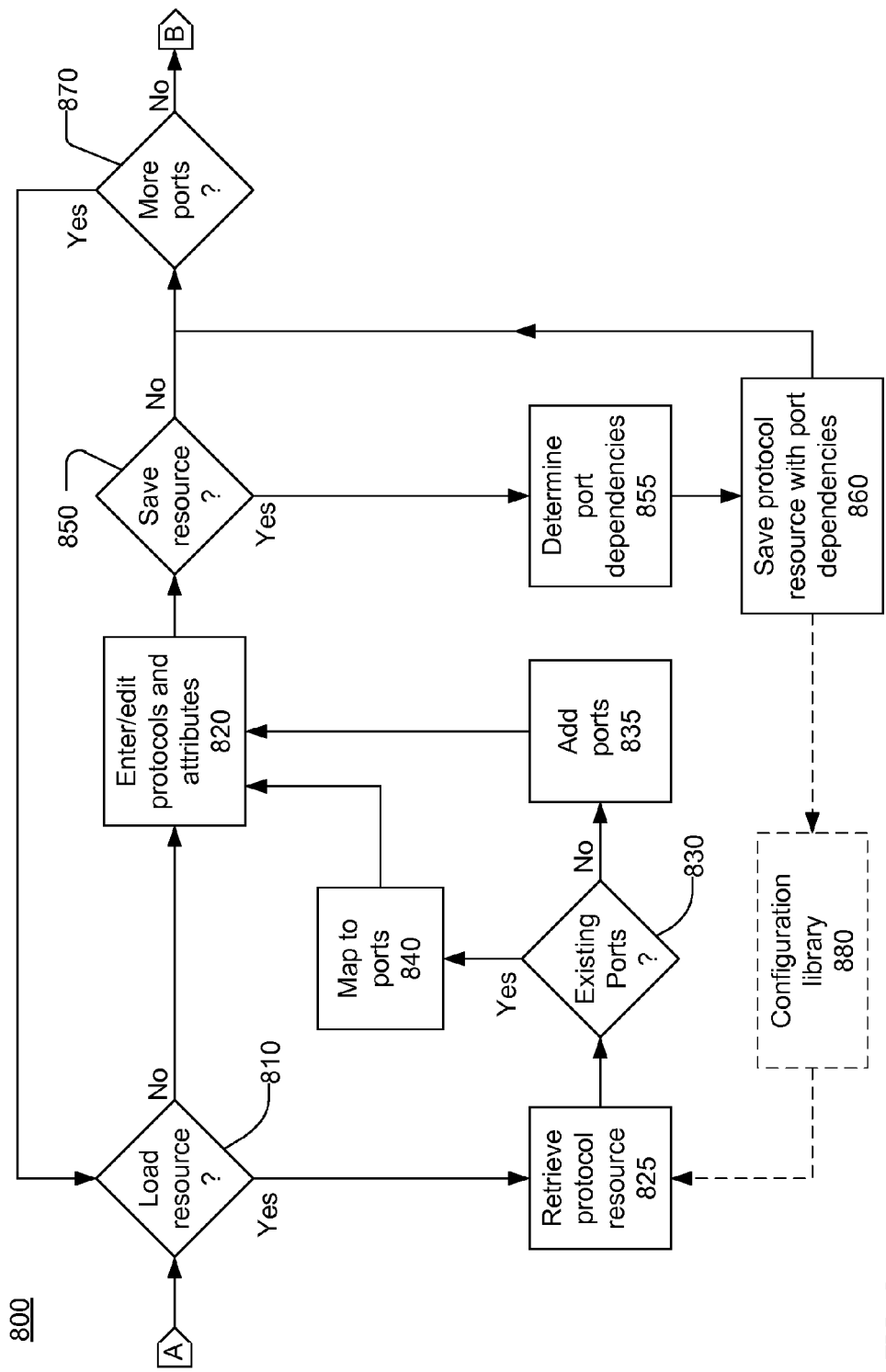
FIG. 8 is a flow chart of another portion of the process for defining a test configuration.
Figure 9:
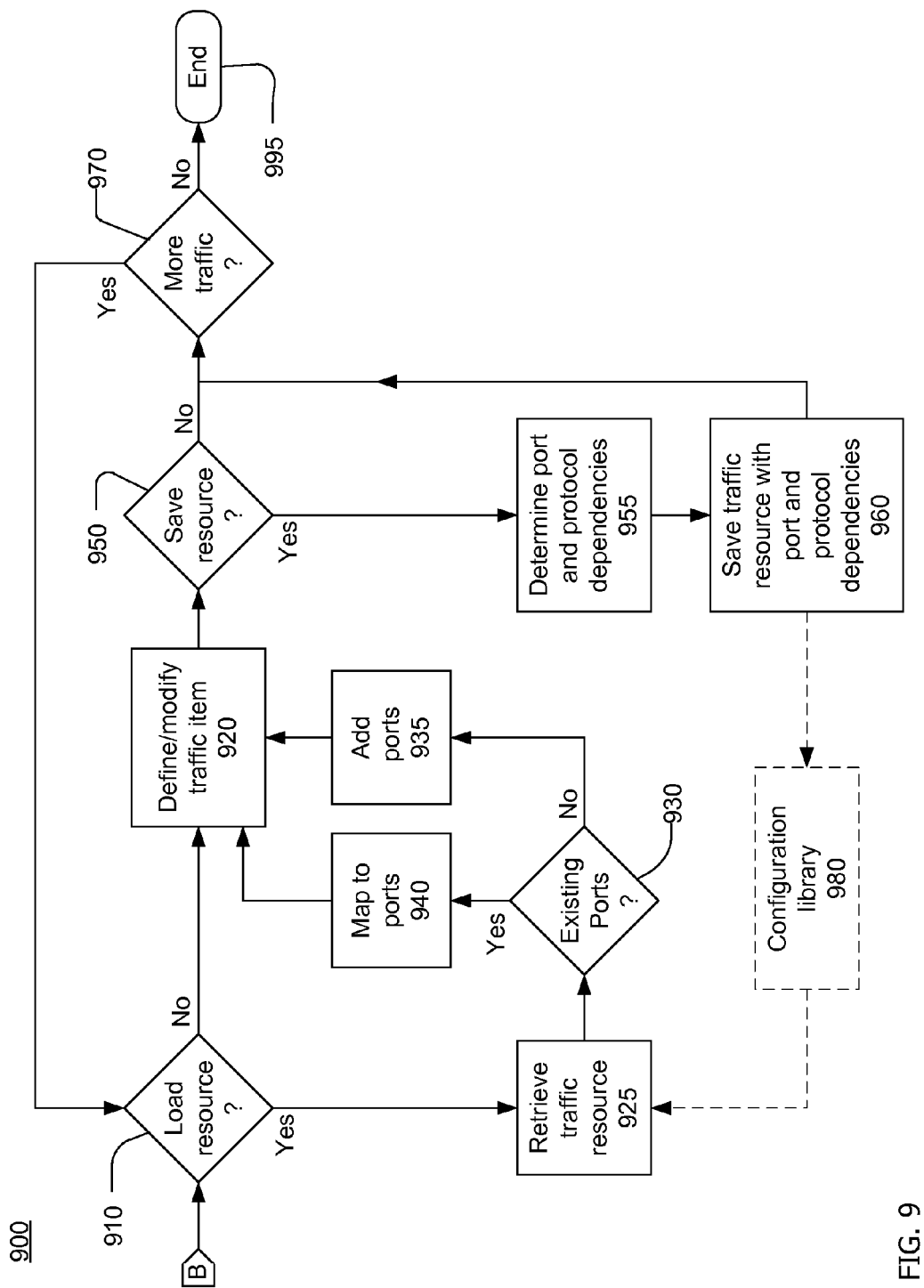
FIG. 9 is a flow chart of another portion of the process for defining a test configuration.

FIG. 7, FIG. 8, and FIG. 9 collectively show a flow chart of a process for generating a test configuration which may be suitable for use at 410 in the process 400. The process of FIG. 7, FIG. 8, and FIG. 9 may be performed by a test administrator computing device, such as the test administrator 210, interacting with a test engineer or other user via a graphic user interface. Each action shown in FIG. 7, FIG. 8, and FIG. 9 may be performed in response to specific user input received via the user interface.

For ease of discussion, FIG. 7, FIG. 8, and FIG. 9 are based on an assumption that all ports are defined before protocols, and all protocols are defined before traffic. However, in practice, ports, protocols, and traffic may be defined in some other order, subject to the limitation that a port must be defined before any protocols can be defined for that port, and at least a portion of the protocols for a port must be defined before any traffic can be defined for that port.

Referring now to FIG. 7, a process 700 for defining ports for a test configuration may begin at 705 and end after 770, at which point the process may continue as shown in FIG. 8. The process 700 may be cyclic in nature, and the actions from 710 to 770 may be repeated for a large number of ports within a test configuration.

At 710, a determination may be made whether or not a port resource will be loaded from a configuration library 780, which may be the configuration library 480. This option will be available only if one or more port resources were previously saved in the configuration library 780. When a port resource will not be loaded, one or more new ports may be created within the test configuration at 715, and attributes of the newly created ports may be entered and/or edited at 720.

When a determination is made at 710 that a port resource will be loaded, a port resource may be retrieved from the configuration library 780 at 725. Retrieving the port resource may include, for example, acquiring a list of available port resources from the configuration library, displaying all or a portion of the list of available port resources, receiving a user selection of an available port resource, and reading the selected port resource from the configuration library.

At 730, a determination may be made how the port resource retrieved at 725 will be incorporated into the test configuration. The retrieved port resource may define port attributes for a single port or a plurality of ports. Each port defined in the port resource may be added to the test configuration as a new port at 735, or may be mapped to an existing port at 740. The option to map a port defined in a port resource to an existing port will exist only if the test configuration includes one or more previously defined ports. When a port defined in a retrieved port resource is mapped to an existing port at 740, the attributes of the retrieved port may be added to or replace the attributes of the existing port. Each port defined in a port resource may be replicated in the test configuration and mapped to multiple new and/or existing ports. The graphical user interface may provide a screen to facilitate mapping the ports defined in a port, protocol, or traffic resource to new or existing ports in a test configuration. Once the port resource retrieved at 725 has been incorporated into the test configuration, the attributes of some or all of the ports may be edited and/or additional attributes may be entered at 720.

At 750, a determination may be made if all or a portion of the test configuration will be saved as a port resource. When a determination is made to save a port resource, at 760 a selected portion of the test configuration may be saved in the configuration library 780 as a port resource. The saved ports resource may include the hardware and physical layer configuration and attributes of some or all of the ports defined in the test configuration.

At 770, a determination may be made if more ports will be added to the test configuration. When more ports are required, the process 700 may repeat from 710. When all ports have been defined within the test configuration, the process may proceed to "A" in FIG. 8.

Referring now to FIG. 8, a process 800 for defining protocols for a test configuration may continue from the process 700 of FIG. 7, and may end after 870, at which point the process may continue as shown in FIG. 9. The process 800 may be cyclic in nature, and the actions from 810 to 870 may be repeated for a large number of ports within a test configuration.

At 810, a determination may be made whether or not a protocol resource will be loaded from a configuration library 880, which may be the configuration library 480. This option may be available only if one or more protocol resources were previously saved in the configuration library 880. When a protocol resource will not be loaded, protocols and protocol attributes for existing ports (i.e. ports defined during the preceding process 700) may be entered and/or edited at 820.

When a determination is made at 810 that a protocol resource will be loaded, a protocol resource may be retrieved from the configuration library 880 at 825. Retrieving the protocol resource may include, for example, acquiring a list of available protocol resources from the configuration library, displaying all or a portion of the list of the available protocol resource, receiving a user selection of an available protocol resource, and reading the selected protocol resource from the configuration library.

At 830, a determination may be made how the protocol resource retrieved at 825 will be incorporated into the test configuration. The retrieved protocol resource may define protocols, protocol attributes, and port attributes for a single port or a plurality of ports. Each port identified in the protocol resource may be added to the test configuration as a new port at 835, or may be mapped to an existing port at 840. Each port identified in the protocol resource may be replicated and mapped to multiple new and/or existing ports in the test configuration. When a port defined in a retrieved protocol resource is mapped to an existing port at 840, the attributes of the retrieved port may be added to or replace the attributes of the existing port. Once the protocol resource retrieved at 825 has been incorporated into the test configuration, the protocols and protocol attributes of some or all of the ports may be edited and/or additional protocols and protocol attributes may be entered at 820.

At 850, a determination may be made if all or a portion of the test configuration will be saved as a protocol resource. When a determination is made to save one or more selected protocols and associated attributes as a protocol resource, port dependencies (the hardware and physical layer configuration and attributes of ports necessary for operation of the selected protocols) may be determined at 855. At 860, the selected protocols and attributes from 850 and the port dependencies from 855 may be saved in the configuration library 880 as a protocol resource.

At 870, a determination may be made if more protocols will be added to the test configuration. When more protocols are required, the process 800 may repeat from 810. When all protocols have been defined within the test configuration, the process may proceed to "B" in FIG. 9.

Referring now to FIG. 9, a process 900 for defining traffic for a test configuration may continue from the process 800 of FIG. 8, and may end at 995. The process 900 may be cyclic in nature, and the actions from 910 to 970 may be repeated numerous times to define traffic for a test configuration.

At 910, a determination may be made whether or not a traffic resource will be loaded from a configuration library 980, which may be the configuration library 480. This option may be available only if one or more traffic resources were previously saved in the configuration library 980. When a traffic resource will not be loaded, a traffic item may be defined and/or edited at 820. As previously discussed, a traffic item may be defined in terms of IP datagrams, TCP connections, application layer transaction, user activities, and in other manners.

When a determination is made at 910 that a traffic resource will be loaded, a traffic resource may be retrieved from the configuration library 980 at 925. Retrieving the traffic resource may include, for example, acquiring a list of available traffic resources from the configuration library, displaying a list of the available traffic resources, receiving a user selection of an available traffic resource, and reading the selected traffic resource from the configuration library.

At 930, a determination may be made how the protocol resource retrieved at 925 will be incorporated into the test configuration. The retrieved traffic resource may include one or more traffic items which, in combination, define traffic to be exchanged between a specific number of ports. A retrieved traffic resource may be mapped to exactly the same number of ports in the test configuration. Each port identified in the traffic resource may be added to the test configuration as a new port at 835, or may be mapped to an existing port at 840. When a port defined in a retrieved traffic resource is mapped to an existing port at 840, the attributes of the retrieved port may be added to or replace the attributes of the existing port. A retrieved traffic resource may be replicated and mapped to multiple sets of ports within the test configuration. Once the traffic resource retrieved at 825 has been incorporated into the test configuration, the traffic items defined in the traffic resource may be edited at 920.

At 950, a determination may be made if all or a portion of the test configuration will be saved as a traffic resource. When a determination is made to save one or more traffic items as a traffic resource, protocol and port dependencies (the hardware and physical layer configuration of ports, port attributes, layer 2/3 protocols, and protocol attributes required by the identified traffic items) may be determined at 955. At 960, the selected traffic items from 950 and the port and protocol dependencies from 955 may be saved in the configuration library 980 as a traffic resource.

At 970, a determination may be made if more traffic will be added to the test configuration. When more traffic is required, the process 900 may repeat from 910. When all traffic has been defined within the test configuration, the process may end at 995.

Figure 10:
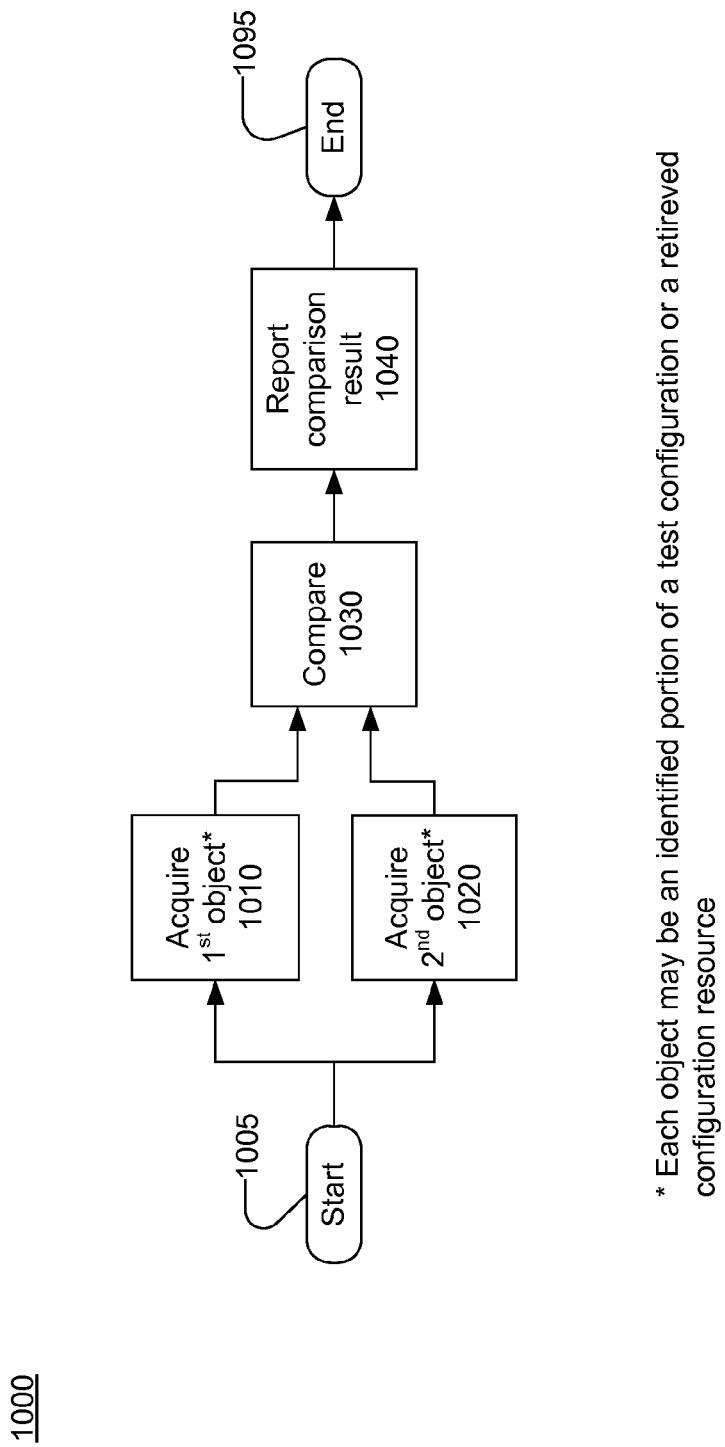
FIG. 10 is a flow chart of a process for comparing test configurations and test configuration resources.

FIG. 10 is a flow chart of a process 1000 for comparing two test configuration resources, a test configuration resource and a portion of a test configuration, or two portions of the same or different test configurations. The process 1000 may be performed independently, or at any point within the processes 700, 800, and 900 of FIG. 7, FIG. 8, and FIG. 9, respectively.

The process 1000 may begin at 1005 and end at 1095. At 1010 and 1020, first and second comparison objects may be acquired. Either or both of the first and second comparison objects may be a test configuration resource retrieved from a library of test configuration resources. Either or both of the first and second comparison objects may be an identified portion of the same test configuration. The first and second comparison objects may be identified portions of the same or different test configuration.

At 1030, the first and second comparison objects may be compared and changes, additions, and deletions between the first and second comparison objects may be identified. At 1040, the results of the comparison may be reported. For example, the results of the comparison may be reported on a screen of a graphical user interface, with differences between the first and second comparison objects identified. For example, the configuration and attributes of the first and second comparison objects may be presented side-by-side in a tabular format with differences highlighted or distinctively colored.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A test configuration resource manager for a network test system, comprising:
   a computer readable storage medium storing instructions that, when executed, cause a computing device to perform a resource manager process, comprising:
   defining a first test configuration including attributes of a plurality of test ports, a respective protocol suite for each of the plurality of test ports, and one or more traffic items to be generated by the plurality of tests ports during a test session;
   receiving a user input identifying a portion of the first test configuration;
   storing the identified portion of the first test configuration as a test configuration resource in a library of test configuration resources;
   receiving a user input identifying a stored test configuration resource in the library of test configuration resources;
   retrieving the stored test configuration resource; and
   incorporating the retrieved test configuration resource into a second test configuration, wherein
   incorporating the retrieved test configuration resource into the second test configuration further comprises mapping one or more ports defined in the retrieved test configuration resource to ports within the second test configuration, and
   at least one port defined in the retrieved test configuration resource is replicated and mapped to a plurality of ports in the second test configuration.

2. The test configuration resource manager of claim 1, wherein the identified portion of the first test configuration is a port resource defining a hardware and physical layer configuration for one or more ports.

3. The test configuration resource manager of claim 1, wherein the identified portion of the first test configuration is a protocol resource defining
   a layer 2/3 protocol suite for one or more ports, and
   a hardware and physical layer configuration of the one or more ports necessary to implement the layer 2/3 protocol suite.

4. The test configuration resource manager of claim 1, wherein the identified portion of the first test configuration is a traffic resource defining
   traffic to be exchanged by two or more ports of the network test system during a test session, a layer 2/3 protocol suite for each of the two or more ports, the layer 2/3 protocol suite defining protocols necessary to exchange the defined traffic, and the hardware and physical layer configuration of the two or more ports necessary to implement the respective layer 2/3 protocol suite.

5. The test configuration resource manager of claim 1, further comprising:

a storage device comprising the computer readable storage medium;

a processor and memory coupled to the storage device and configured to execute the stored instructions.

6. The test configuration resource manager of claim 1, wherein at least one port defined in the retrieved test configuration resource is mapped to an existing port in the second test configuration.

7. The test configuration resource manager of claim 1, wherein at least one port defined in the retrieved test configuration resource is added to the second test configuration as a new port.

8. A method of managing test configuration resources in a network test system, comprising:

defining a first test configuration including attributes of a plurality of test ports, a respective protocol suite for each of the plurality of test ports, and one or more traffic items to be generated by the plurality of tests ports during a test session;

receiving a user input identifying a portion of the first test configuration;

storing the identified portion of the first test configuration as a test configuration resource in a library of test configuration resources;

receiving a user input identifying a stored first test configuration resource in the library of test configuration resources;

retrieving the first test configuration resource; and incorporating the retrieved first test configuration resource into a second test configuration, wherein incorporating the retrieved first test configuration resource into a second test configuration further comprises mapping one or more ports defined in the retrieved first test configuration resource to ports within the second test configuration, and at least one port defined in the retrieved first test configuration resource is replicated and mapped to a plurality of ports in the second test configuration.

9. The method of claim 8, wherein the identified portion of the first test configuration is a port resource defining a hardware and physical layer configuration for one or more ports.

10. The method of claim 8, wherein the identified portion of the first test configuration is a protocol resource defining a layer 2/3 protocol suite for one or more ports, and a hardware and physical layer configuration of the one or more ports necessary to implement the layer 2/3 protocol suite.

11. The method of claim 8, wherein the identified portion of the first test configuration is a traffic resource defining traffic to be exchanged by two or more ports of the network test system during a test session, a layer 2/3 protocol suite for each of the two or more ports, the layer 2/3 protocol suite defining protocols necessary to exchange the defined traffic, and the hardware and physical layer configuration of each of the two or more ports necessary to implement the respective layer 2/3 protocol suite.

12. The method of claim 8, wherein at least one port defined in the retrieved first test configuration resource is mapped to an existing port in the second test configuration.

13. The method of claim 8, wherein at least one port defined in the retrieved first test configuration resource is added to the second test configuration as a new port.

14. The method of claim 8, further comprising:

receiving a user input identifying a stored second test configuration resource in the library of test configuration resources;

retrieving the second test configuration resource;

comparing the retrieved second test configuration resource and an identified portion of the second test configuration; and providing a display on a graphical user interface indicating a difference between the retrieved second test configuration resource and the identified portion of the second test configuration.

\* \* \* \* \*